(No Model.)

F. J. BLAKE.
FERTILIZER DISTRIBUTER.

No. 560,131. Patented May 12, 1896.

Witnesses:
C. H. Raeder
W. A. James

Inventor
F. J. Blake
By James J. Sheehy
Attorney

UNITED STATES PATENT OFFICE.

FRED J. BLAKE, OF FORT DODGE, IOWA.

FERTILIZER-DISTRIBUTER.

SPECIFICATION forming part of Letters Patent No. 560,131, dated May 12, 1896.

Application filed March 23, 1896. Serial No. 584,422. (No model.)

*To all whom it may concern:*

Be it known that I, FRED J. BLAKE, a citizen of the United States, residing at Fort Dodge, in the county of Webster and State of Iowa, have invented certain new and useful Improvements in Fertilizers; and I do declare the following to be a full, clear, and exact description of the invention, such as will enable others skilled in the art to which it appertains to make and use the same.

My invention relates to improvements in fertilizer-distributers; and it has for its general object to provide a cheap and simple distributer which may be readily connected to an ordinary wagon and one which is designed and adapted to deposit a bucketful of manure or fertilizer upon each hill of corn, which, as is well known, are ordinarily placed equidistant on the ground.

Other objects and advantages of the invention will be fully understood from the following description and claims when taken in conjunction with the accompanying drawings, in which—

Figure 1:
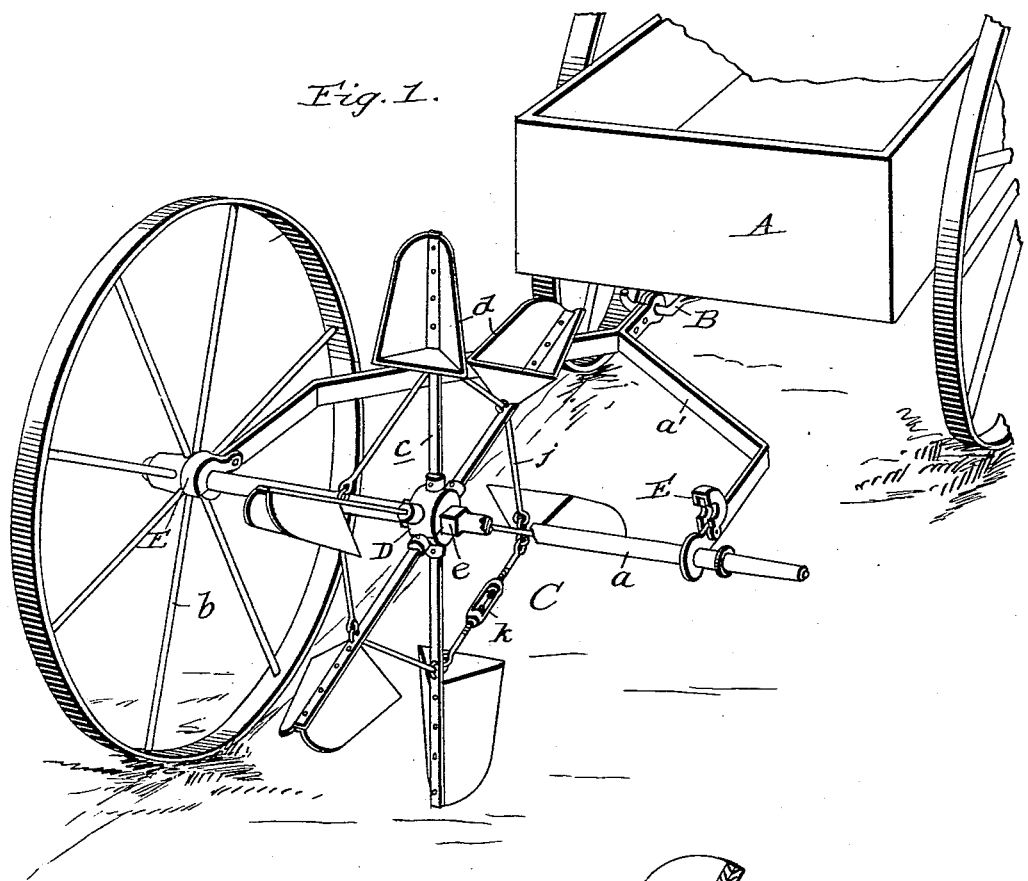
Figure 2:
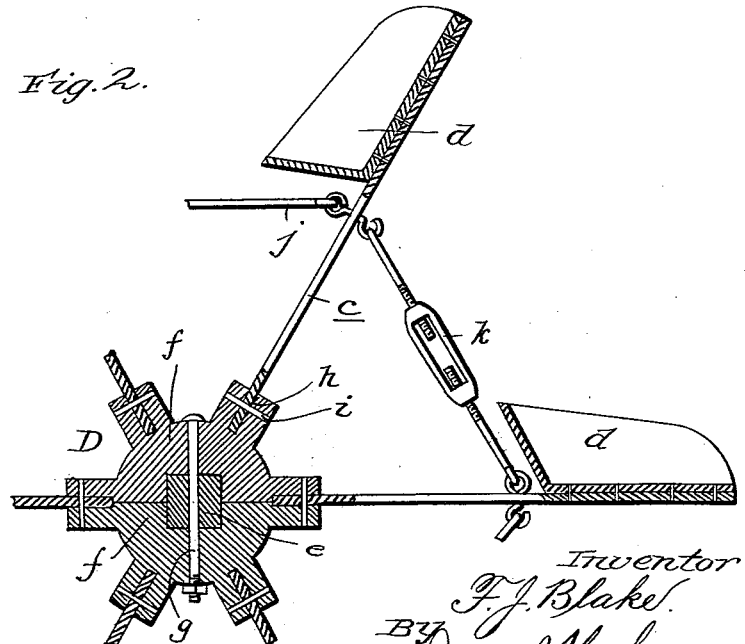

Figure 1 is a perspective view illustrating the rear portion of a wagon and my improved distributer connected thereto, and Fig. 2 is an enlarged vertical section of a portion of the shovel or bucket wheel of the machine.

Referring by letter to the said drawings, A indicates a portion of a wagon or cart body, which may be of the ordinary or any suitable construction. B indicates a hook which is connected to the body and is designed to effect the connection of the fertilizer-distributer thereto, although any other suitable means may be employed for this purpose, and C indicates my improved fertilizer-distributer, which is drawn along behind a wagon or cart containing manure or fertilizer and is designed to be charged with manure or fertilizer by a person on the wagon, and is also designed and adapted to deposit such manure or fertilizer upon the corn-hills, which are ordinarily arranged at equidistant points upon the ground. This distributer C comprises a bail-frame $a'$, an axle $a$, journaled in said frame, traveling wheels $b$, which are fixed on the axle so as to turn therewith and are preferably arranged such a distance apart as to enable them to follow in the tracks of the wagon or cart wheels, and a plurality of spokes $c$, which are fixedly connected to the axle, preferably at the middle thereof, and are provided at their outer ends with buckets or shovels $d$, as illustrated. The spokes $c$, and consequently the buckets $d$, are arranged at an equal distance apart, and the buckets $d$ are preferably of the scoop form shown, in virtue of which it will be seen that when the wagon and the distributer are drawn forward and the buckets are charged with fertilizer by a person on the wagon they will deposit such fertilizer on the ground at equidistant points. The spokes $c$ and buckets are arranged a distance apart corresponding to the ordinary distance between corn-hills, and consequently it will be observed that when the distributer is drawn along a row of corn-hills and is charged with fertilizer, as described, it will deposit such fertilizer in bucketfuls exactly upon the corn-hills, and this in a very expeditious manner, which is a desideratum in this class of devices.

The spokes $c$ may be connected to the axle $a$ and may be connected together in any approved manner. I prefer, however, to make the middle portion of the axle (indicated by $e$) of angular form in cross-section and mount thereon a hub D. (Better shown in Fig. 2.) This hub D comprises two sections $f$, which are connected together and to the axle $a$ by a bolt $g$, and it is provided with a plurality of sockets $h$, which sockets are preferably of an angular form in cross-section and are designed to receive the correspondingly-shaped inner ends of the spokes $c$, which are secured in the sockets by bolts $i$, as shown. This manner of securing the spokes to the axle, while very simple, is very durable and strong and permits of the connection of the spokes being readily effected, as will be appreciated. The spokes $c$ are connected at intermediate points of their length by stay-rods $j$, which materially strengthen said spokes, and one of these rods is provided with a turnbuckle $k$, through the medium of which the connection of all the spokes may be quickly and easily effected when desired.

E indicates dust-guards, which are hinged on the frame $a'$, as shown, and are designed to exclude dust and dirt from the bearings of the frame, in which the axle $a$ is journaled.

In the practical operation of my invention the wagon or cart body A is loaded with the manure or fertilizer to be distributed, and the distributer is connected thereto, as shown in Fig. 1 of the drawings. The wagon is then started over a row of corn-hills, care being taken to have the wheel C in alinement with the corn-hills, and an attendant on the wagon shovels the fertilizer or manure into the buckets when they reach the foremost point in the revolution of the wheel. This fertilizer or manure the buckets $d$, in turn, deposit exactly on the corn-hills, and consequently it will be appreciated that the growth of the corn will be materially accelerated.

It will be seen from the foregoing that my improved distributer is exceedingly simple and may therefore be produced and sold with profit for a small price. It will also be seen that the distributer is very strong and durable, and that consequently it will not be likely to get out of repair even with the roughest usage.

Having described my invention, what I claim is—

1. A fertilizer-distributer comprising an axle, traveling wheels fixed on the axle at opposite ends thereof, and buckets arranged at equal distance apart and connected with the axle and adapted to move in a circle with the axle between the traveling wheels, substantially as and for the purpose set forth.

2. A fertilizer-distributer comprising an axle, traveling wheels fixed on the axle at opposite ends thereof, spokes fixedly connected with the axle between the traveling wheels and arranged at an equal distance apart, and buckets carried by the spokes at the outer ends thereof, substantially as and for the purpose set forth.

3. A fertilizer-distributer comprising the frame adapted to be connected with a wagon, the axle journaled in said frame and having a portion $e$, of angular form in cross-section, at an intermediate point of its length, traveling wheels fixed on the axle at the ends thereof, the hub formed in two sections and having radial sockets of angular form in cross-section, a bolt connecting said sections together and to the axle, spokes arranged and secured in the sockets of the hub, and buckets connected to said spokes, substantially as and for the purpose specified.

In testimony whereof I affix my signature in presence of two witnesses.

FRED J. BLAKE.

Witnesses:
M. J. MITCHELL,
W. C. GRAY.